US009382856B2

(12) United States Patent
Kuriyama et al.

(10) Patent No.: US 9,382,856 B2
(45) Date of Patent: Jul. 5, 2016

(54) SYSTEM FOR FUEL INJECTION CONTROL IN AN INTERNAL COMBUSTION ENGINE

(71) Applicant: SUZUKI MOTOR CORPORATION, Shizuoka (JP)

(72) Inventors: Sako Kuriyama, Shizuoka (JP); Hiroki Inata, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 546 days.

(21) Appl. No.: 13/873,866

(22) Filed: Apr. 30, 2013

(65) Prior Publication Data

US 2013/0312708 A1 Nov. 28, 2013

(30) Foreign Application Priority Data

May 23, 2012 (JP) .................................. 2012-117175

(51) Int. Cl.
| | |
|---|---|
| *F02D 41/00* | (2006.01) |
| *F02D 41/34* | (2006.01) |
| *F02D 35/02* | (2006.01) |
| *F02D 41/14* | (2006.01) |

(52) U.S. Cl.
CPC .............. *F02D 41/00* (2013.01); *F02D 35/026* (2013.01); *F02D 41/345* (2013.01); *F02D 2041/1412* (2013.01); *Y02T 10/44* (2013.01)

(58) Field of Classification Search
CPC ....... F02D 41/00; F02D 41/40; F02D 41/401; F02D 41/402
USPC ............................ 701/104, 105; 123/430, 478
See application file for complete search history.

(56) References Cited

U.S. PATENT DOCUMENTS

| | | | | |
|---|---|---|---|---|
| 2005/0096833 | A1* | 5/2005 | Nakazawa | .......... F02D 41/0002 701/102 |
| 2005/0098154 | A1* | 5/2005 | Ohtani | ................ F02D 41/1498 123/431 |
| 2013/0312708 | A1* | 11/2013 | Kuriyama | ............... F02D 41/00 123/478 |

FOREIGN PATENT DOCUMENTS

| | | |
|---|---|---|
| CN | 1616809 A | 5/2005 |
| JP | 3669175 B2 | 4/2005 |
| JP | 2011-208646 A | 10/2011 |

OTHER PUBLICATIONS

The First Office Action mailed Jun. 3, 2015 in corresponding Chinese Patent Application No. 201310190066.7 (with an English translation) (10 pages).

* cited by examiner

*Primary Examiner* — Hieu T Vo
*Assistant Examiner* — Arnold Castro
(74) *Attorney, Agent, or Firm* — Rothwell, Figg, Ernst & Manbeck, P.C.

(57) ABSTRACT

A system for fuel injection control in internal combustion engine is provided. Fuel is injected during exhaust stroke from a fuel injector for port injection upstream of an intake valve. In-cylinder temperature as the engine cylinder undergoes compression is predicted. Fuel is injected during intake stroke from the fuel injector to supply fuel to the inside of the cylinder upon determining that the predicated in-cylinder temperature is greater than a temperature beyond which preignition is expected to happen.

9 Claims, 9 Drawing Sheets

(1): DEAD TIME
(3): VALVE OPENING TIME FOR EXHAUST STROKE SPLIT INJECTION
(4): VALVE OPENING TIME FOR INTAKE STROKE SPLIT INJECTION
(3)+(4): VALVE OPENING TIME FOR INTAKE STROKE SPLIT INJECTION

SYSTEM FOR FUEL INJECTION CONTROL IN AN INTERNAL COMBUSTION ENGINE

CROSS-REFERENCE TO RELATED APPLICATION

The present application claims priority to Japanese Patent Application No. 2012-117175, filed on May 23, 2012, the entire contents of which are hereby incorporated by reference for all purposes.

TECHNICAL FIELD

The present invention relates to techniques for fuel injection control specifically for controlling operation of a fuel injection valve in an internal combustion engine.

BACKGROUND

Conventionally, pre-ignition combustion events, which, under operating conditions with high load or high EGR (EGR: Exhaust Gas Recirculation, which is herein used to encompass external EGR and internal EGR), engines that have high compression ratios may be prone to, become an issue on many occasions.

A tendency that pre-ignition combustion events take place results from higher compression ratios due to an increase in an intake of combustible charge entering a cylinder during operation with high load than compression ratios during driving with low load and a rise in cylinder temperature due to an increase in recirculation of high temperature exhaust gases into the cylinder caused by an increase in an amount of EGR. The pre-ignition combustion events may cause very high in-cylinder pressures, and may result in serious damages to a piston in the cylinder and a cylinder head.

In one example, JP Patent No. 3669175 discloses technology on EGR to address the issue. According to this technology, when a level of the pre-ignition combustion events is greater than or equal to a predetermined level, a valve overlap target in an amount of intake and exhaust valve overlap is reduced compared with that in the ordinary use. According to the technology disclosed by JP Patent No. 3669175, a tendency that exhaust system burned gases may be pushed through an engine cylinder during intake and exhaust valve periods is restrained to reduce an amount of high temperature unburned residual gases, lowering gas temperature in the cylinder, thereby avoiding the pre-ignition combustion events.

Incidentally, there is one approach for early detection of pre-ignition (or prediction of pre-ignition) based on detection of knocking (e.g., a defined number of subsequent occurrences of knocking). Among early combustion events, some are derived from a rise in temperature of cylinder inner walls (or a piston crown, a cylinder head combustion chamber) due to knocking while others without any indication of knocking under certain temperature conditions (intake temperature, exhaust gas temperature, engine coolant temperature and etc). Thus, it is difficult to always predict pre-ignition based on detection of knocking.

As another approach for detection of pre-ignition (or prediction of pre-ignition), pre-ignition is detected by measuring ion currents. In any case, prediction of pre-ignition is needed because it is likely that pre-ignition combustion events can result in serious damages to engines (pistons and etc.).

As one of various pre-ignition mitigating steps, by injecting fuel into a cylinder of a PFI (Port Fuel Injection) type engine during intake stroke when an intake valve opens, the vaporization heat of fuel is utilized to achieve cylinder charge cooling, which reduces likelihood of cylinder pre-ignition combustion events. However, the injection of fuel during intake stroke into the cylinder may cause HC (hydrocarbon) and CO (carbon monoxide), which are toxic unburned components, to increase. Moreover, the injection of fuel into a cylinder during intake stroke may result in admission of liquid fuel into the cylinder, thereby increasing likelihood of occurrence of soot. It is for this reason that avoiding always injecting fuel during intake stroke is desirable. Frequently injecting fuel into the cylinder during intake stroke may cause the injected fuel to adhere to the cylinder liner, thereby increasing likelihood of lubricant oil dilution by the adhered fuel.

The injection of fuel during exhaust stroke may reduce likelihood of the occurrence of HC, CO, soot and so forth because of the atomization of the injected fuel within an intake port before the injected fuel is combusted in a cylinder.

SUMMARY

An object of the present invention is to inject fuel during intake stroke in a more appropriate manner for reducing pre-ignition combustion event in a cylinder together with more accurate prediction of pre-ignition.

According to one aspect (1) of the present invention, there is provided a system for fuel injection control in internal combustion engine for controlling a fuel injector, positioned upstream of an intake valve provided per each cylinder of the internal combustion engine, coupled to an admission path for admitting gas to the cylinder, comprising: a fuel injector control function configured to inject fuel from the fuel injector during exhaust stroke of the cylinder when an exhaust valve opens; an in-cylinder temperature prediction function configured to predict in-cylinder temperature as the cylinder undergoes compression; and a control modification function configured to modify control by the fuel injector control function so as to inject fuel from the fuel injector during intake stroke of the cylinder when the intake valve opens to supply fuel to the inside of the cylinder upon determining that the in-cylinder temperature as the cylinder undergoes compression which is predicted by the in-cylinder temperature prediction function is greater than a predetermined temperature beyond which pre-ignition is expected to happen.

According to one aspect (2) of the present invention, it is preferred that the system further comprises: a difference calculation function configured to calculate, when the control modification function determines that the in-cylinder temperature as the cylinder undergoes compression which is predicted by the in-cylinder temperature prediction function is higher than the predetermined temperature beyond which pre-ignition is expected to happen, a difference between the in-cylinder temperature as the cylinder undergoes compression and the predetermined temperature beyond which pre-ignition is expected to happen; and that the control modification function modifies control by the fuel injector control function so as to inject fuel from the fuel injector during the intake stroke to supply fuel to the inside of the cylinder upon determining that the difference which is calculated by the difference calculation function is greater than a predetermined threshold, and modifies control by the fuel injector control function so as to inject fuel from the fuel injector during the exhaust stroke and to inject fuel from the fuel injector during the intake stroke immediately after the exhaust stroke to supply fuel to the inside of the cylinder upon determining that the difference which is calculated by the difference calculation function is less than or equal to the predetermined threshold.

According to one aspect (3) of the present invention, it is preferred that the control modification function modifies control by the fuel injector control function so as not to inject fuel from the fuel injector during the exhaust stroke but to inject fuel in volume, which is given by adding the volume of fuel scheduled to be injected during the exhaust stroke to the volume of fuel scheduled to be injected during the intake stroke immediately after the exhaust stroke, from the fuel injector during the intake stroke to supply fuel to the inside of the cylinder upon determining that the fuel injection period to be implemented during exhaust stroke is shorter than a predetermined fuel injection period even when the difference which is calculated by the difference calculation function is less than or equal to the predetermined threshold.

According to one aspect (4) of the present invention, it is preferred that the control modification function raises a sharing ratio of the injection period for intake stroke injection to the total injection period given by adding the injection period for the exhaust stroke injection to the injection period for the intake stroke injection such that the smaller the difference, the higher the sharing ratio becomes.

According to one aspect (5) of the present invention, it is preferred that the fuel injection for the exhaust stroke is terminated before the intake valve opens and the fuel injection for the intake stroke is initiated after the exhaust valve closes.

According to one aspect (6) of the present invention, it is preferred that the internal combustion engine admits exhaust gases into the inside of the cylinder by external Exhaust Gas Recirculation and internal Exhaust Gas Recirculation; that the system further comprises: an intake temperature detection function, coupled to the admission path of the internal combustion engine, configured to measure temperature of gas admitted into the inside of the cylinder from the intake valve side; an exhaust temperature detection function, coupled to an exhaust path for exhausting exhaust gas from the internal combustion engine at a portion upstream of a catalyst for purifying the exhaust gas, configured to measure temperature of the exhaust gas; a gas temperature calculation function configured to correct the gas temperature measured by the intake temperature detection function with a first correction coefficient, which becomes bigger as the engine speed and the intake pressure on the intake valve side become higher, and also with a second correction coefficient, which becomes bigger as the engine coolant temperature and the intake pressure on the intake valve side become higher to calculate the corrected temperature of the gas; and an exhaust gas temperature calculation function configured to correct the exhaust gas temperature measured by the exhaust gas temperature detection function with a third correction coefficient, which becomes bigger as the valve overlap when the exhaust valve and the intake valve open become longer, and also with a fourth correction coefficient, which becomes bigger as the engine coolant temperature and the engine speed become higher to calculate the corrected temperature of the exchange gas, and wherein the in-cylinder temperature prediction function calculates the in-cylinder temperature as the cylinder undergoes compression based on the temperature of gas calculated by the gas temperature calculation function and the temperature of exhaust gas calculated by the exhaust gas temperature calculation function.

According to one aspect (7) of the present invention, it is preferred that the in-cylinder temperature prediction function calculates the in-cylinder temperature $T_f$ as the cylinder undergoes compression, which temperature is expressed by $$T_f = T_0 \cdot (V_0/V_f)^{(k-1)}$$

where $V_0$ is the in-cylinder volume as corrected by correcting that volume which is defined in the cylinder by the piston positioned when the intake valve closes with a fifth correction coefficient, which becomes bigger as the intake pressure on the intake valve side becomes higher and varies in response to engine speed, and a sixth correction coefficient, which becomes bigger as the engine coolant temperature and the engine speed become higher; $T_0$ is the temperature of gas in the cylinder when the intake vale closes; $V_f$ is the volume that is defined in the cylinder by the piston positioned at top dead center; and k is the heat capacity ratio.

According to the one aspect (1), normally fuel is injected during exhaust stroke and, when the in-cylinder temperature as the cylinder undergoes compression is higher than a predetermined temperature beyond which pre-ignition is expected to happen, the inside of cylinder is cooled by latent heat of vaporization of fuel atomized inside cylinder by injecting fuel during intake stroke. Since, according to one aspect (1), the use of fuel injection during exhaust stroke is made normally, but the use of fuel injection during intake stroke is made restrictively, the occurrence of unburned gas, such as HC (Hydrocarbon), CO (Carbon monoxide) and so forth, and soot are reduced and dilution of lubricant in cylinder is reduced.

In addition, according to the aspect (1), pre-ignition combustion events are predictable more accurately without any detection of knocking by predicting in-cylinder temperature as the cylinder undergoes compression and comparing the predicted in-cylinder temperature to the predetermined temperature beyond which pre-ignition is expected to happen. This prevents pre-ignition from imparting damages to the internal combustion engine according to the aspect (1) of the present invention because pre-ignition combustion events are reduced beforehand. From those described above, according to the aspect (1) of the present invention, fuel is injected during intake stroke more appropriately to reduce pre-ignition combustion events together with more accurate prediction of pre-ignition.

According to the aspect (2) of the present invention, when the predicted in-cylinder temperature as the cylinder undergoes compression is higher than the predetermined temperature beyond which pre-ignition is expected to happen and a difference between these temperatures is greater than a predetermined threshold, fuel is injected from fuel injector during intake stroke only to positively lower in-cylinder temperature to reduce pre-ignition combustion events.

In addition, according to the aspect (2) of the present invention, when, although the predicted in-cylinder temperature as the cylinder undergoes compression is higher than the predetermined temperature beyond which pre-ignition is expected to happen, a difference between these temperatures is less than or equal to the predetermined threshold, a portion of fuel is injected during exhaust stroke to reduce HC, CO, soot and so forth. Further, according to the aspect (2) of the present invention, fuel injection from fuel injector is split into one during intake stroke and the other during exhaust stroke, making it easier to mix the injected fuel with air, thus improving homogeneity of fuel and air.

According to the aspect (3) of the present invention, if fuel cannot be injected in a desired manner during exhaust stroke because the fuel injection period to be implemented during exhaust stroke is shorter than the minimum fuel injection period which the fuel injector needs to have for fuel injection, the fuel injection for exhaust stroke can be avoided. Further, according to the aspect (3) of the present invention, supply of fuel needed for combustion can be prevented from running short by injecting fuel in volume, which is given by adding the volume of fuel scheduled to be injected during the exhaust stroke to the volume of fuel scheduled to be injected during intake stroke immediately after the exhaust stroke.

According to the aspect (4) of the present invention, HC, CO, soot and set forth are more appropriately reduced by making the fuel injection period for exhaust stroke longer as the difference between the in-cylinder temperature as the cylinder undergoes compression and the predetermined temperature beyond which pre-ignition is expected to happen becomes shorter.

According to the aspect (5) of the present invention, during valve overlap when both intake and exhaust valves open, fuel injection can be avoided. This, according to the aspect (5) of the present invention, can prevent unburned gas from flowing out of cylinder which undergoes valve overlap. As a result, deterioration of emission level of exhaust gases is prevented.

According to the aspect (6) of the present invention, in-cylinder temperature as the cylinder undergoes compression is predicted taking external EGR and internal EGR into account. In other words, according to the aspect (6) of the present invention, the temperature of gas (e.g. a mixed gas of a mixture of fresh air and fuel and a gas due to external EGR) admitted to the inside of cylinder from intake valve side and the temperature of exhaust gas returned to the inside of cylinder from exhaust valve side are taken into account in predicting the in-cylinder temperature as the internal combustion engine undergoes compression.

Further, according to the aspect (6) of the present invention, since the temperature of gas admitted to the inside of cylinder from intake valve side and the temperature of exhaust gas returned to the inside of cylinder from exhaust valve side are corrected based on operating conditions of the internal combustion engine, the in-cylinder temperature as the internal combustion engine undergoes compression, which matches the operating conditions of the internal combustion engine, is predictable.

According to the aspect (7) of the present invention, since it is calculated after correcting in-cylinder volume $V_0$ when piston is positioned as intake valve closes based on operating conditions of the internal combustion engine, in-cylinder temperature $T_f$, which matches the operating conditions of the internal combustion engine, is predictable.

DETAILED DESCRIPTION

Referring to the accompanying drawings, embodiment(s) of the present invention are described. As the present embodiment, a vehicle with a system for fuel injection control in an internal combustion engine is mentioned.

Figure 1:
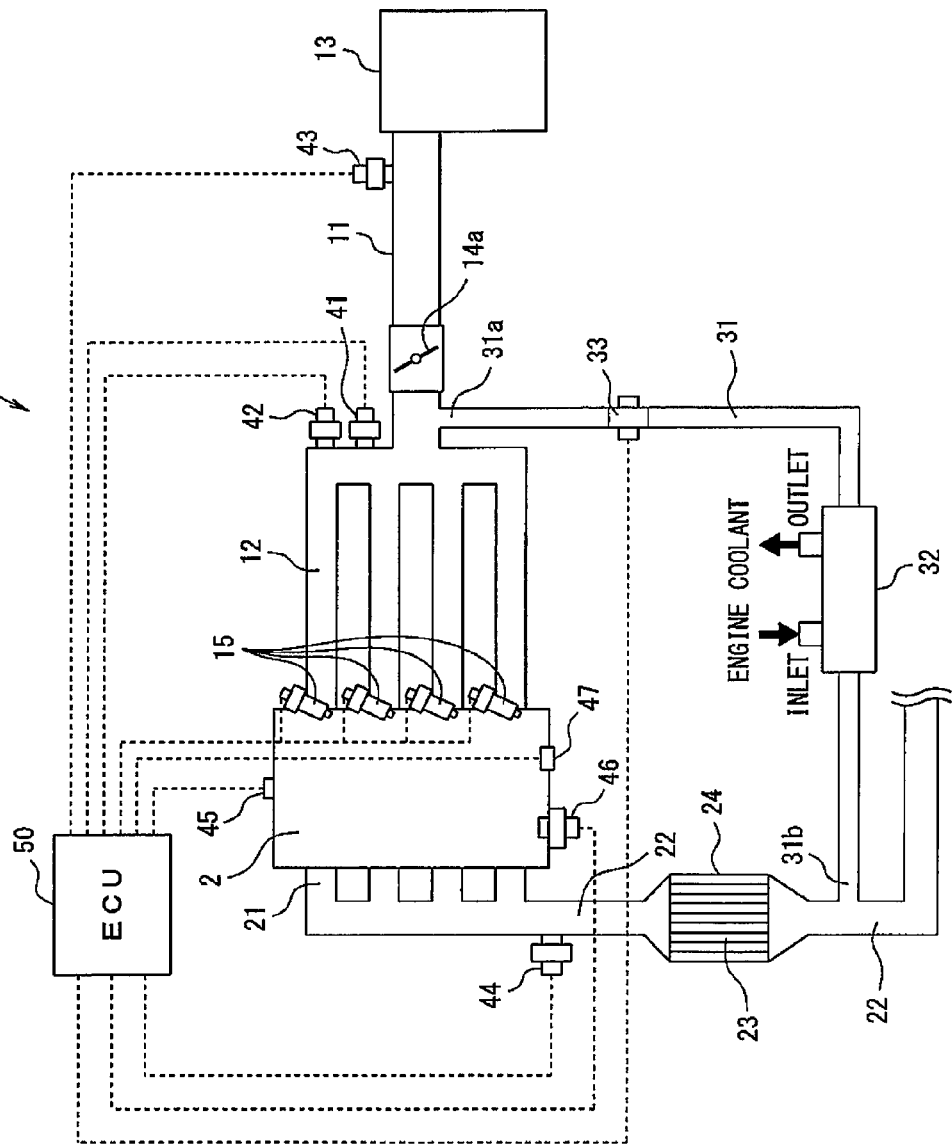
FIG. 1 is a schematic diagram of an example configuration of a vehicle according to the present embodiment.

FIG. 1 is a schematic diagram of an example configuration of vehicle 1 according to the present embodiment. As shown in FIG. 1, according to the present embodiment, internal combustion engine 2 mounted to vehicle 1 is four-stroke internal combustion engine 2. Moreover, according to the present embodiment, internal combustion engine 2 is four-cylinder internal combustion engine.

In intake system of internal combustion engine 2, intake passage 11 is coupled to intake manifold 12 communicable with combustion chamber of each cylinder of internal combustion engine 2. Intake passage 11 includes air cleaner 13 positioned on its upstream side and electronically controlled throttle body 14 positioned on its downstream side. One end 31a of EGR (Exhaust Gas Recirculation) passage 31 is coupled to intake passage 11 downstream of electronically controlled throttle body 14. Electronically controlled throttle body 14 has therein throttle valve 14a. In electronically controlled throttle body 14, the position of throttle valve 14a is controlled by ECU (Electronic Control Unit).

For intake manifold 12, each cylinder is configured with fuel injection valve (i.e. fuel injector) 15 upstream of and in close proximity to intake valve, not illustrated, for the cylinder. Fuel injector 15 is controlled by ECU 50 such that a fuel injection amount, a fuel injection timing and so forth may be adjusted. In exhaust system of internal combustion engine 2, exhaust manifold 21 communicable with combustion chamber of each cylinder of internal combustion engine 2 is coupled to exhaust passage 22. Exhaust passage 22 includes a catalyst case 24 accommodating a catalyst 23. The other end 31b of EGR passage 31 is coupled to exhaust passage 22 downstream of catalyst case 24.

EGR passage 31 includes an EGR cooler 32 and an EGR valve 33 which are positioned in this order in the fluid flow path from the end coupled to exhaust passage 22 to the end coupled to intake passage 11. EGR passage 31, EGR cooler 32 and EGR valve 33 form constituent elements to achieve external EGR. In other words, exhaust gas is admitted to EGR passage 31 from exhaust passage 22; and EGR cooler 32 cools the admitted exhaust gas with an engine coolant. EGR valve 33 varies the amount of exhaust gas provided to intake passage 11 routed via EGR passage 31 from exhaust passage 22 to intake passage 11. EGR valve 33 is controlled by ECU 50.

Internal combustion engine 2 in the vehicle according to the present embodiment is configured to be able to provide internal EGR too. In other words, in internal combustion engine 2, the valve overlap when both intake and exhaust valves are open allows a reintroduction of burnt gas directly into a combustion chamber of each cylinder from an exhaust port side. Moreover, the vehicle according to the present embodiment has intake temperature sensor 41, intake air pressure sensor 42, air flow sensor 43, exhaust temperature sensor 44, crank angle sensor 45, engine coolant temperature sensor 46 and cam angle sensor 47.

Intake temperature sensor 41 and intake air pressure sensor 42 are coupled to intake manifold 12 (specifically, surge tank of intake manifold 12) downstream of electronically controlled throttle body 14 and a portion that mounts EGR passage 31 to intake passage 11. Intake temperature sensor 41 is configured to measure temperature of a gas provided to intake manifold 12 (specifically, a mixture of air and exhaust gas routed via external EGR). Intake temperature sensor 41 provides measurement value to ECU 50. Intake air pressure sensor 42 is configured to measure intake air pressure. Intake air pressure sensor 42 provides measurement value to ECU 50.

Air flow sensor 43 is positioned in intake passage 11 between air cleaner 13 and electronically controlled throttle body 14, specifically, downstream of and in close proximity to air cleaner 13. This air flow sensor 43 is configured to measure an amount of air provided to intake passage 11. Air flow sensor 43 provides measurement value to ECU 50.

Exhaust temperature sensor 44 is positioned in exhaust passage 22 upstream of catalyst case 24 and configured to measure temperature of exhaust gas. Exhaust temperature sensor 44 provide measurement value to ECU 50. Crank angle sensor 45 is coupled to internal combustion engine 2 and configured to measure crank angle. Crank angle sensor 45 provides measurement value to ECU 50.

Engine coolant temperature sensor 46 is coupled to internal combustion engine 2 and configured to measure temperature of coolant of internal combustion engine 2. Engine coolant temperature sensor 46 provides measurement value to ECU 50. Cam angle sensor 47 is coupled to internal combustion engine 2 and configured to measure cam angle (i.e. valve lift of intake valve, valve lift of exhaust valve). Cam angle sensor 47 provides measurement values to ECU 50.

ECU 50 is configured with, for example, a microcomputer and its peripheral circuits. Therefore, for example, ECU 50 is configured with CPU, ROM, RAM and so forth. ROM stores one, two or more programs to implement various processing steps. CPU executes various processing steps following instructions of one, two or more programs. This ECU 50 controls operation of internal combustion engine 2 based on measurement values from various kinds of sensors including intake temperature sensor 41 and so forth. According to the present embodiment, ECU 50 controls operation of each fuel injection based on measurement values from various kinds of sensors.

Figure 2:
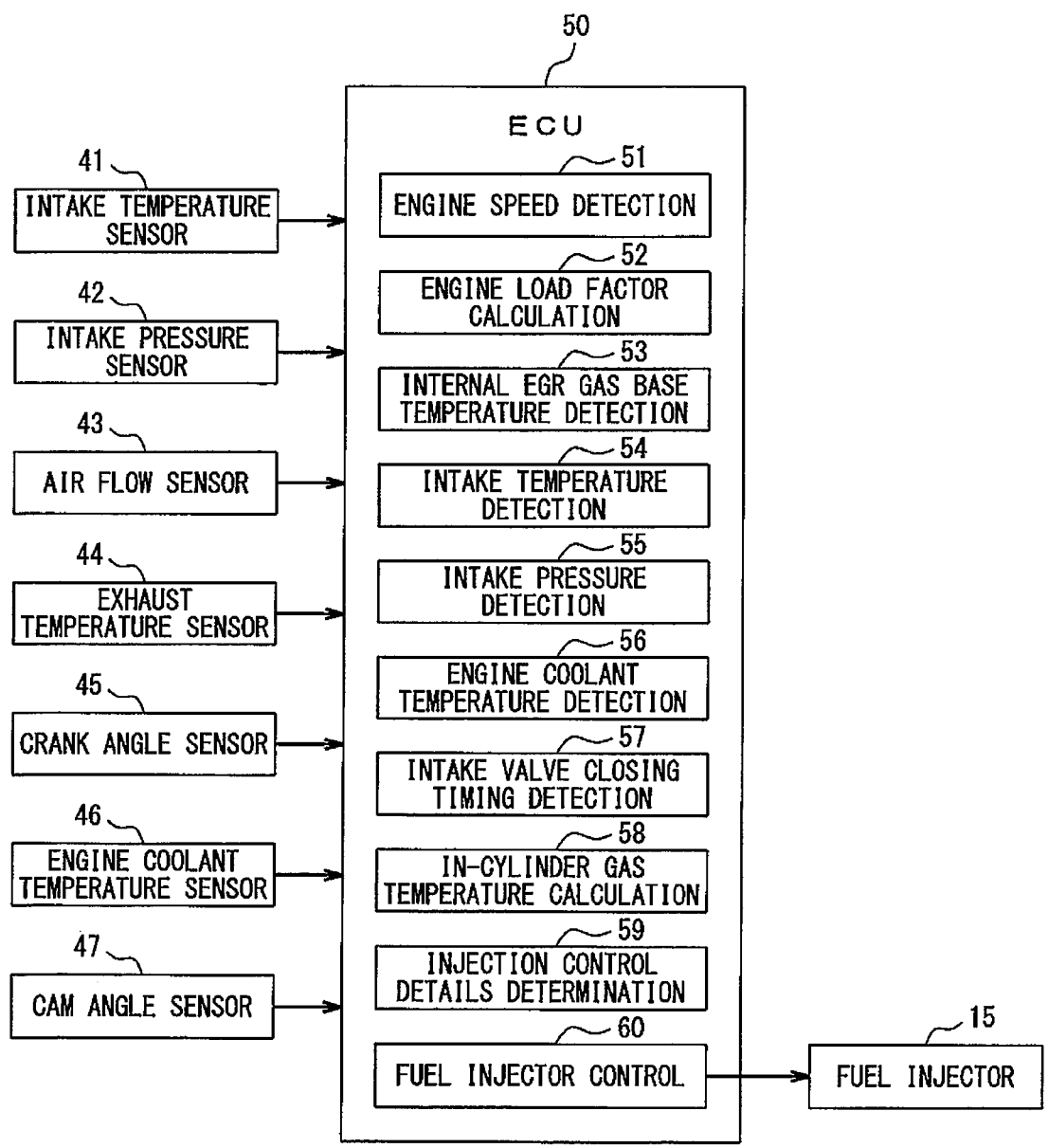
FIG. 2 is a block diagram of an example configuration of an ECU.

FIG. 2 is a block diagram of an example configuration of ECU 50 in order to implement such controls. As shown in FIG. 2, ECU 50 has engine speed detection function 51, engine load factor calculation function 52, internal EGR gas base temperature detection function 53, intake temperature detection function 54, intake air pressure detection function 55, engine coolant detection function 56, intake valve closing timing detection function 57, in-cylinder gas temperature calculation function 58, injection control details determination function 59 and fuel injection valve control function 60.

Figure 3:
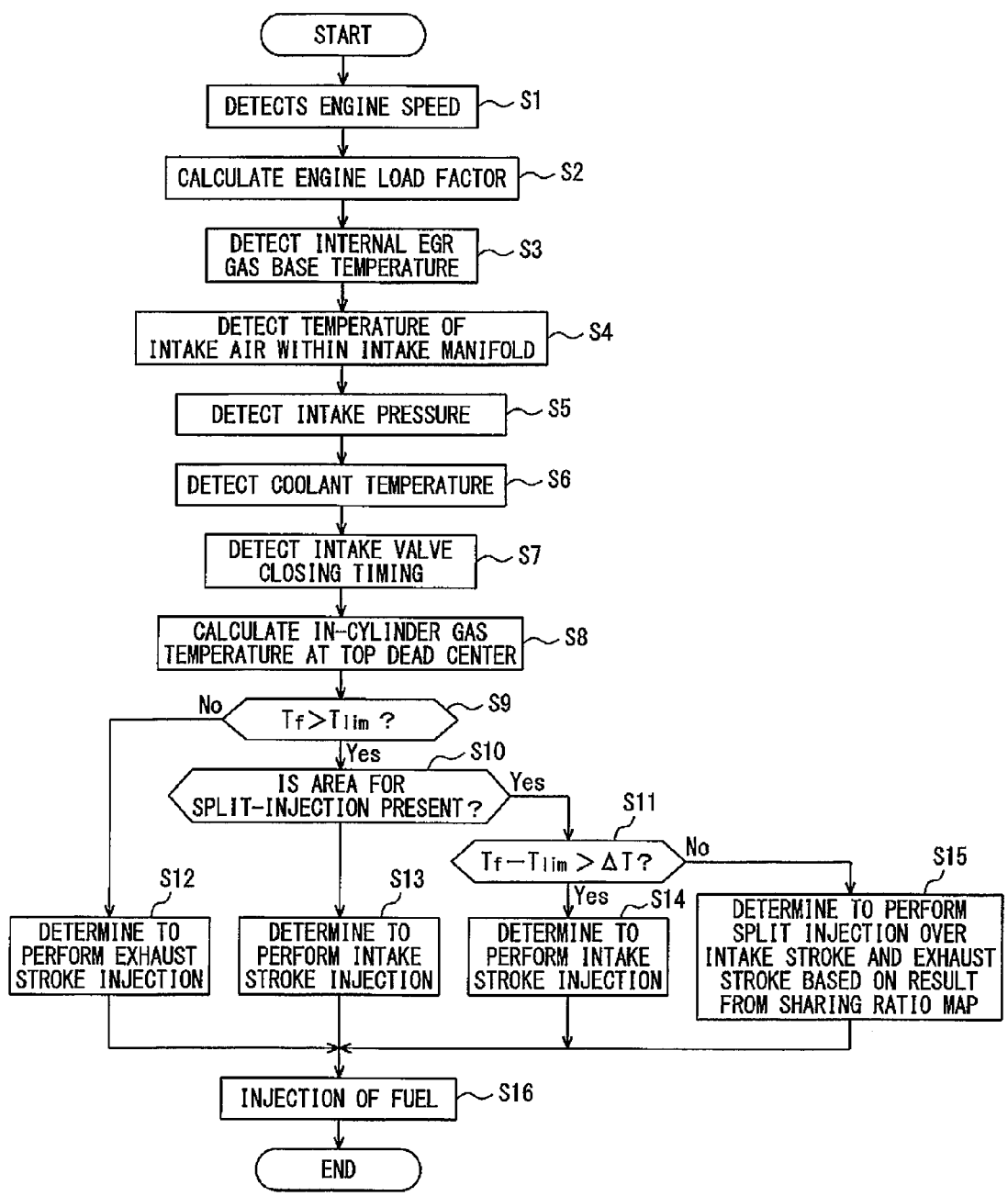
FIG. 3 is a flow chart depicting an example fuel injection control processing strategy by the ECU.

FIG. 3 is a flow chart depicting an example fuel injection control strategy implemented by the illustrated configuration of ECU in FIG. 2. Processing details at various functions 51 to 60 of ECU 50 shown in FIG. 2 are described along with processing steps shown in FIG. 3 as follows. As shown in FIG. 3, at step S1, ECU 50 detects engine speed based on measurement value from crank angle sensor 45 by engine speed detection function 51.

Next, at step S2, ECU 50 calculates engine load factor based on measurement value from air flow sensor 43, number of cylinder and engine displacement by engine load factor calculation function 52. The more measurement value from air flow sensor 43 or the amount of intake air becomes, the higher engine load factor becomes.

Next, at step S3, ECU 50 detects base temperature of internal EGR gas based on measurement value from exhaust temperature sensor 44 by internal EGR gas base temperature detection function 53. Next, at step S4, ECU 50 detects temperature of intake air within intake manifold 12 from measurement value from intake temperature sensor 41 by intake temperature detection function 54. Precisely, ECU 50 detects temperature of mixture of intake air and exhaust gas routed via external EGR by intake temperature detection function 54.

Next, at step S5, ECU 50 detects intake air pressure based on measurement value from intake air pressure sensor 42 by intake air pressure detection function 55. Precisely, ECU 50 detects pressure of mixture of intake air and exhaust gas routed via external EGR. Next, at step S6, ECU 50 detects engine coolant temperature based on measurement value from engine coolant temperature sensor 46 by engine coolant temperature detection function 56.

Next, at step S7, ECU 50 detects closing timing of intake valve based on measurement value from cam angle sensor 47 and measurement value from crank angle sensor 45 by intake valve closing timing function 57.

Next, at step S8, ECU 50 calculates in-cylinder gas temperature at top dead center (i.e. during compression stroke) by in-cylinder gas temperature calculation function 58. Specifically, in-cylinder gas temperature calculation function 58 calculates in-cylinder gas temperature $T_f$ at top dead center using equation (1) as follows:

$$T_f = T_0 \cdot (V_0/V_f)^{(k-1)} \qquad (1)$$

where $T_0$ is the absolute temperature (K) within cylinder (i.e. of gas within cylinder) when intake valve closes. In addition, $V_0$ is the volume (m³) within cylinder when intake valve closes. $V_0$ includes the volume of combustion chamber. In addition, $V_f$ is the volume (m³) within cylinder at the moment when piston is at TDC. In addition, k is the heat capacity ratio. In the case of air, k is 1.4.

In the above equation, rise in temperature due to ignition before piston reaches TDC is not included. An example process of deriving the above-mentioned equation (1) is as follows. First, the equation of state of a hypothetical ideal gas may be expressed in the following form (2).

$$P \cdot V = m \cdot R \cdot T$$

or $$P \cdot v = R \cdot T$$

or $$P = \rho \cdot R \cdot T \qquad (2)$$

where P is the pressure of the gas. In addition, V is the volume of the gas. In addition, T is the temperature of the gas. In addition, m is the mass of the gas. In addition, R is the gas constant. In addition, v is the specific volume. In addition, ρ is the bulk density.

The equation of state of gas at the moment when intake valve closes may be expressed in the following form (3).

$$P_0 \cdot V_0 = R \cdot T_0 = R \cdot (273 + T_i) \tag{3}$$

where $P_0$ is the pressure ($P_0$) of gas when intake valve closes. In addition, $V_0$ is the volume (m³) of cylinder when intake valve closes. In addition, as mentioned before, $T_0$ is the absolute temperature (K) within cylinder when intake valve closes. In addition, $T_i$ is the temperature (Celsius temperature, ° C.) within cylinder when intake valve closes.

The following equation (4) holds.

$$P_0 \cdot V_0^k = \text{const.}$$

$$P_0 \cdot V_0^k = P_f (V_0/(V_0/V_f))^k \tag{4}$$

On the other hand, the equation of state of gas at the moment when piston is at TDC may be expressed in the following form (5).

$$P_f \cdot V_f = R \cdot T_f$$

$$P_f \cdot V_f = P_f (V_0/\varepsilon) \tag{5}$$

where $P_f$ is the in-cylinder pressure ($P_a$) at the moment when piston is at TDC. In addition, as mentioned before, $V_f$ is the volume (m³) within cylinder at the moment when piston is at TDC. In addition, as mentioned before, $T_f$ is the absolute temperature (K) within cylinder (i.e. of gas within cylinder) at the moment when intake valve is at TDC.

A ratio of a volume change in cylinder is expressed by the following equation (6);

$$\varepsilon = V_0/V_f \tag{6}$$

By solving the equations listed above, equation (1) may be derived. According to the present embodiment, $T_0$ of equation (1) is given by the following equation (7).

$$T_0 = (A_{ex} \cdot B_{ex} \cdot T_{ex} + A_{in} \cdot B_{in} \cdot T_{in})/2 \tag{7}$$

where $T_{ex}$, $A_{ex}$, $B_{ex}$, $T_{in}$, $A_{in}$ and $B_{in}$ take on the following values. $T_{ex}$ is the value detected by internal EGR gas base temperature detection function 53. This means that $T_{ex}$ is the temperature of exhaust gas, a source of internal EGR.

$A_{ex}$ is the correction coefficient designed to correct $T_{ex}$. The larger an amount of gas routed via internal EGR (hereinafter referred to as "internal EGR gas") or a reintroduction amount of burned gas into cylinder becomes, the bigger this correction coefficient $A_{ex}$ becomes. Note that the larger an amount of valve overlap becomes, the larger an amount of internal EGR gas becomes. Accordingly, the larger an amount of valve overlap becomes, the bigger $A_{ex}$ becomes.

Figure 4:
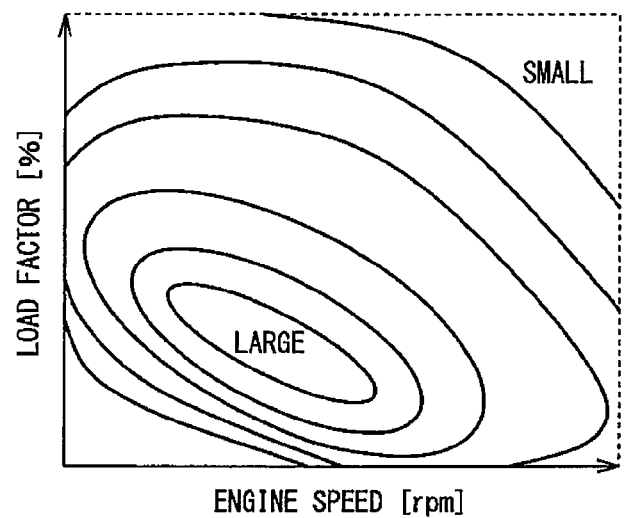
FIG. 4 is a graph depicting an example correction coefficient $A_{ex}$.

FIG. 4 shows an example correction coefficient $A_{ex}$. As shown in FIG. 4, the correction coefficient $A_{ex}$ is determined from relationship between engine speed, which is detected by engine speed detection function 51, and engine load factor, which is calculated by engine load factor calculation function 52. This characteristic diagram shown in FIG. 4, for example, is obtained experimentally. In-cylinder gas temperature calculation function 58 holds the example characteristic diagram shown in FIG. 4 in the form of a map (for example, a three-dimensional map) and refers to this map to select the appropriate value of correction coefficient $A_{ex}$ in response to engine speed and engine load factor.

$B_{ex}$ is the correction coefficient to correct $T_{ex}$. The lower engine coolant temperature becomes, the smaller this correction coefficient $B_{ex}$ becomes, and the lower engine speed becomes, the smaller the correction coefficient $B_{ex}$ becomes. One reason why correction coefficient $B_{ex}$ is made to vary in this way is that the lower engine coolant temperature becomes, the higher the degree, to which heat of internal EGR gas is lost due to impingement on cylinder liner, cylinder head and port wall, becomes, thereby increasing the probability that temperature of internal EGR gas may drop. Another reason is that the lower engine speed becomes, the higher the degree, to which heat of internal EGR gas is lost due to impingement on cylinder liner, cylinder head and port wall, becomes due to an increase in the residual time of internal EGR gas in cylinder, thereby increasing the probability that temperature of internal EGR gas may drop.

Figure 5:
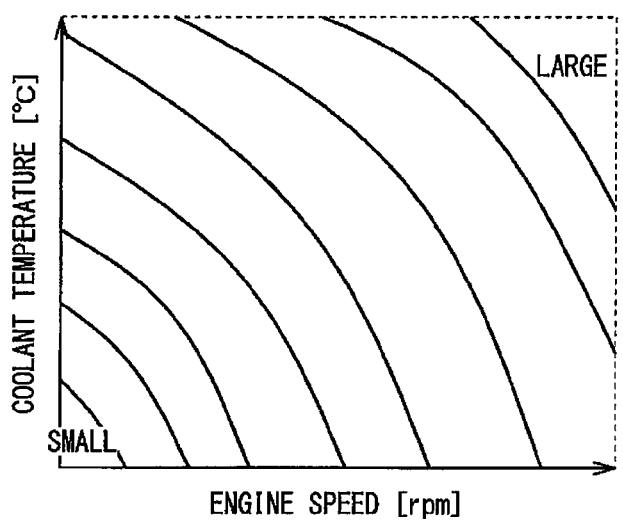
FIG. 5 is a graph depicting an example correction coefficient $B_{ex}$.

FIG. 5 shows an example correction coefficient $B_{ex}$. The correction coefficient $B_{ex}$ is determined from relationship between engine speed, which is detected by engine speed detection function 51, and coolant temperature, which is detected by engine coolant temperature detection function 56. This characteristic diagram shown in FIG. 5, for example, is obtained experimentally. In-cylinder gas temperature calculation function 58 holds the example characteristic diagram shown in FIG. 5 in the form of a map (for example, a three-dimensional map) and refers to this map to select the appropriate value of correction coefficient $B_{ex}$ in response to engine speed and coolant temperature.

Therefore, the product $A_{ex} \cdot B_{ex} \cdot T_{ex}$ takes on a value resulting from correcting temperature $T_{ex}$ of internal EGR gas, which is a gas reintroduced into cylinder during valve overlap from exhaust valve after it has been discharged from the cylinder, with correction coefficient $A_{ex}$ based on an amount of exhaust gas during the valve overlap, and also with correction coefficient $B_{ex}$ based on a decrease or an increase in temperature of exhaust gas in response to temperature of cylinder internal structure. Thus, the value of the product $A_{ex} \cdot B_{ex} \cdot T_{ex}$ is indicative of temperature of internal EGR gas in cylinder. In addition, $T_{in}$ is a value detected by intake temperature detection function 54. In other words, $T_{in}$ is indicative of temperature of gas mixture admitted to cylinder from intake valve.

$A_{in}$ is the correction coefficient designed to correct $T_{in}$. This correction coefficient $A_{in}$ corrects $T_{in}$ in response to fresh cylinder charge of gaseous mixture that varies with operating conditions of engine. Concretely, the higher intake air pressure becomes, the larger correction coefficient $A_{in}$ becomes, and the higher engine speed becomes, the larger correction coefficient $A_{in}$ becomes.

Figure 6:
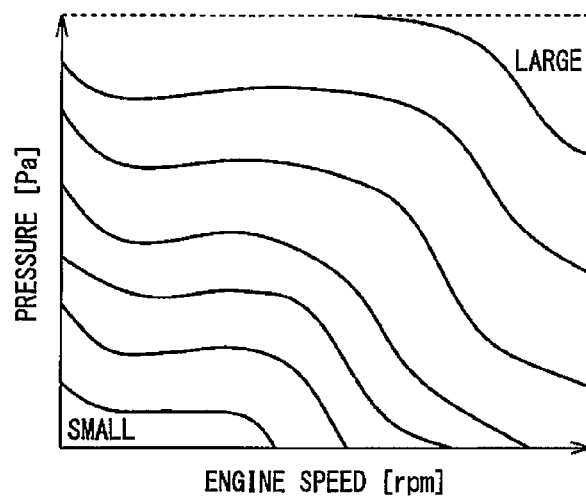
FIG. 6 is a graph depicting an example correction coefficient $A_{in}$.

FIG. 6 shows an example correction coefficient $A_{in}$. As shown in FIG. 6, the correction coefficient $A_{ex}$ is determined from relationship between engine speed, which is detected by engine speed detection function 51, and intake air pressure, which is detected by intake air pressure detection function 55. This characteristic diagram shown in FIG. 6, for example, is obtained experimentally. In-cylinder gas temperature calculation function 58 holds the example characteristic diagram shown in FIG. 6 in the form of a map (for example, a three-dimensional map) and refers to this map to select the appropriate value of correction coefficient $A_{in}$ in response to engine speed and intake air pressure.

$B_{in}$ is the correction coefficient designed to correct $T_{in}$. This correction coefficient $B_{in}$ corrects $T_{in}$ based on intake air pressure and coolant temperature from a point of view resulting from considering how much fresh cylinder charge of gaseous mixture from intake valve is cooled or warmed. Concretely, the higher intake air pressure becomes, the larger correction coefficient $B_{in}$ becomes, and the higher coolant temperature becomes, the larger correction coefficient $B_{in}$ becomes.

Figure 7:
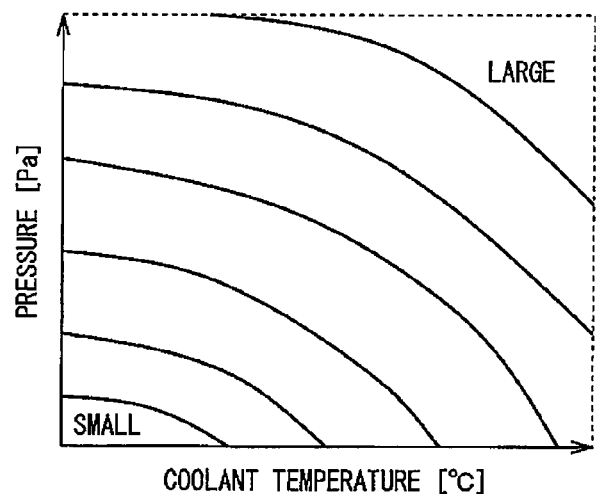
FIG. 7 is a graph depicting an example correction coefficient $B_{in}$.

FIG. 7 shows an example correction coefficient $B_{in}$. As shown in FIG. 7, the correction coefficient $B_{in}$ is determined from relationship between coolant temperature, which is detected by engine coolant detection function 56, and intake air pressure, which is detected by intake air pressure detection function 55. This characteristic diagram shown in FIG. 7, for example, is obtained experimentally. In-cylinder gas temperature calculation function 58 holds the example characteristic diagram shown in FIG. 7 in the form of a map (for example, a three-dimensional map) and refers to this map to select the appropriate value of correction coefficient $B_{in}$ in response to coolant temperature and intake air pressure.

Therefore, the product $A_{in} \cdot B_{in} \cdot T_{in}$ takes on a value resulting from correcting temperature $T_{in}$ of cylinder charge of gaseous mixture from intake valve (mixture of fresh air and fuel and external EGR gas) with correction coefficient $A_{in}$ based on an amount of cylinder charge and also with correction coefficient $B_{in}$ based on a decrease or an increase in temperature of cylinder charge. Thus, the value of the product $A_{in} \cdot B_{in} \cdot T_{in}$ is indicative of temperature of cylinder charge of gaseous mixture from intake valve.

Further, according to the present embodiment, $V_0$ of equation (1) is calculated using the following equation (8).

$$V_0 = L_p \cdot L_w \cdot V_{cyl} \quad (8)$$

where $L_p$, $L_w$ and $V_{cyl}$ take on the following values. $V_{cyl}$ is the volume of cylinder at the moment when intake valve closes. This $V_{cyl}$ is a value that is calculated based on the detected value by intake air pressure detection function 55 and the detected value by intake valve closing timing detection function 57. In concrete terms, $V_{cyl}$ is calculated to indicate a volume of cylinder charge of gaseous mixture based on intake valve closing timing, which is detected by intake valve closing timing detection function 57, and intake air pressure, which is detected by intake air pressure detection function 55.

$L_p$ is the correction coefficient designed to correct $V_{cyl}$. This correction coefficient $L_p$ is a value designed to correct $V_{cyl}$ based on consideration that in-cylinder pressure varies in response to engine speed. This is because gaseous volume of cylinder charge varies with a change in in-cylinder pressure caused by intake and exhaust pulsation effects. Specifically, the higher intake pressure become, the larger correction coefficient $L_p$ becomes. In addition, correction coefficient $L_p$ varies in response to engine speed.

Figure 8:
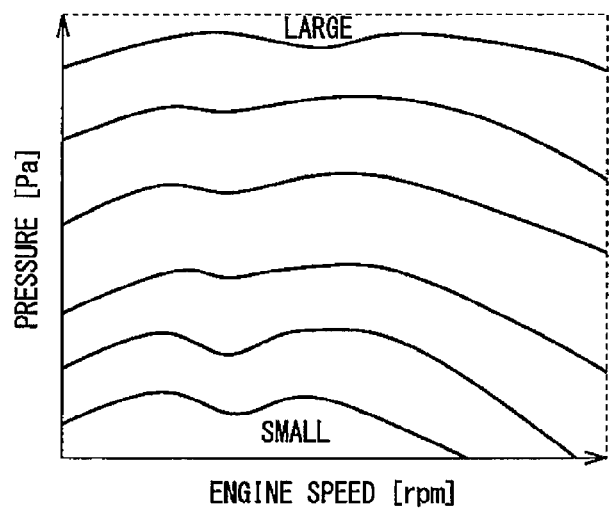
FIG. 8 is a graph depicting an example correction coefficient $L_p$.

FIG. 8 shows an example correction coefficient $L_p$. As shown in FIG. 8, the correction coefficient $L_p$ is determined from relationship between engine speed, which is detected by engine speed detection function 51, and intake air pressure, which is detected by intake air pressure detection function 55. This characteristic diagram shown in FIG. 8, for example, is obtained experimentally. In-cylinder gas temperature calculation function 58 holds the example characteristic diagram shown in FIG. 8 in the form of a map (for example, a three-dimensional map) and refers to this map to select the appropriate value of correction coefficient $L_p$ in response to engine speed and intake air pressure.

$L_w$ is the correction coefficient designed to correct $V_{cyl}$. This correction coefficient $L_w$ is a value designed to correct $V_{cyl}$ based on consideration that in-cylinder pressure varies in response to engine speed and coolant temperature. Specifically, it corrects $V_{cyl}$ after calculating how much in-cylinder pressure is varied due to exchange of heat with engine.

Here, the higher coolant temperature becomes, the higher temperature of gas in cylinder becomes and the more pressure in cylinder increases. Besides, the lower coolant temperature, the more temperature of gas in cylinder decreases and pressure in cylinder decreases. In addition, the lower engine speed, the lower increase rate and decreasing rate of pressure in cylinder become. This is because the higher engine speed, the shorter time required for exchange of heat between gas in cylinder and engine becomes. Correction coefficient $L_w$ is calculated based on such relationship of in-cylinder pressure with coolant temperature and engine speed. According to the present embodiment, the higher coolant temperature, the larger correction coefficient $L_w$ becomes, and the higher engine speed, the larger correction coefficient $L_w$ becomes.

Figure 9:
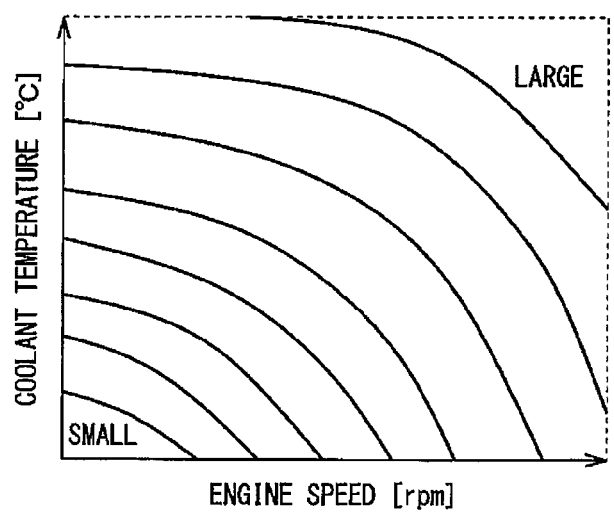
FIG. 9 is a graph depicting an example correction coefficient $L_w$.

FIG. 9 shows an example correction coefficient $L_w$. As shown in FIG. 9, the correction coefficient $L_w$ is determined from relationship between engine speed, which is detected by engine speed detection function 51, and coolant temperature, which is detected by engine coolant temperature detection function 56. This characteristic diagram shown in FIG. 9, for example, is obtained experimentally. In-cylinder gas temperature calculation function 58 holds the example characteristic diagram shown in FIG. 9 in the form of a map (for example, a three-dimensional map) and refers to this map to select the appropriate value of correction coefficient $L_w$ in response to engine speed and coolant temperature.

The reason why $V_{cyl}$ is corrected with coefficients $L_p$ and $L_w$ in the above-mentioned manner is that volume of cylinder charge and in-cylinder pressure vary in response to operating conditions (engine speed, coolant temperature and so forth). Next, at step S9, ECU 50 determines whether or not gas temperature $T_f$, which is calculated at step S8, is greater than a criterion threshold $T_{lim}$ of gas temperature by fuel injection control details determination function 59. Here, criterion threshold $T_{lim}$ of gas temperature is a value of temperature of gaseous mixture in cylinder during compression stroke at which occurrence of early ignition (i.e., pre-ignition) is predicted. Criterion threshold $T_{lim}$ of gas temperature may be determined, for example, experimentally, empirically or theoretically.

If it determines that temperature $T_f$ is greater than criterion threshold $T_{lim}$ of gas temperature ($T_f > T_{lim}$), fuel injection control details determination function 59 determines high probability of occurrence of pre-ignition and causes the routine to proceed to step S10. If it determines that temperature $T_f$ is less than or equal to criterion threshold $T_{lim}$ of gas temperature ($T_f \leq T_{lim}$), fuel injection control details determination function 59 determines low probability of occurrence of pre-ignition and causes the routine to proceed to step S12.

At step S10, fuel injection control details determination function 59 determines whether or not an area which may be set aside for fuel injection in a single combustion cycle is an area for split fuel injection between intake stroke and exhaust stroke (i.e., an area set aside for split fuel injection). Concretely, fuel injection control details determination function 59 determines that an area for split fuel injection is present (or that it is possible to perform split fuel injection) if the minimum fuel injection period (or the minimum injection pulse width) is implemented during each of intake and exhaust strokes. In addition, fuel-injection control details determination function 59 determines that such area for split fuel injection is not present (or that it is not possible to perform split fuel injection) if the minimum injection duration is not allowed during either one of intake and exhaust phase. Here, the minimum fuel injection period is the minimum length of time required for fuel injector to be able to inject fuel. The minimum fuel injection period is determined based on the properties of fuel injector 15, and may vary depending on, for example, accelerator pedal position.

Further, if fuel injection control details determination function 59 determines that the area for split fuel injection is present, the routine proceeds step S11. If fuel injection control details determination function 59 determines that such area for split fuel injection is not present (or that an area for fuel injection does not enable split fuel injection), the routine proceeds to step S13. At step S11, fuel injection control details determination function 59 determines whether or not a difference, which is given by subtracting criterion threshold $T_{lim}$ of gas temperature from gas temperature $T_f (=T_f-T_{lim}$, hereinafter referred to as "a difference in gas temperature) is greater than a difference criterion threshold $\Delta T$. Here, difference criterion threshold $\Delta T$ is a value determined experimentally, empirically or theoretically.

If it determines that the difference in gas temperature is greater than difference criterion threshold $\Delta T$ ($T_f-T_{lim}>\Delta T$), fuel injection control details determination function 59 causes the routine to proceed to step S14. If it determines that the difference in gas temperature is less than or equal to difference criterion threshold $\Delta T$ ($T_f-T_{lim} \leq \Delta T$), fuel injection control details determination function 59 causes the routine to proceed to step S15.

At step S12, fuel injection control details determination function 59 determines to perform, as the fuel injection under normal operating conditions, the injection of fuel during exhaust stroke when exhaust valve is open (i.e. exhaust stroke injection). Then, ECU 50 causes the routine to proceed to step S16. At step S13, fuel injection control details determination function 59 determines to perform the injection of fuel during intake stroke when intake valve is open (i.e. intake stroke injection). Then, ECU 50 causes the routine to proceed to step S16.

At step S14, fuel injection control details determination function 59 determines to perform the injection of fuel during intake stroke only when intake valve is open (i.e. intake stroke injection). Then, ECU 50 causes the routine to proceed to step S16. At step S15, fuel injection control details determination function 59 determines to perform, per one combustion cycle, the injection of fuel during exhaust stroke and the injection of fuel during intake stroke (i.e. split injection). Then, ECU 50 determines the proportion of fuel injection during exhaust stroke and fuel injection during intake stroke (i.e. sharing ratio) based on a sharing ratio map. Then, ECU 50 causes the routine to proceed to step S16. Additionally, determination of the sharing ratio based on the sharing ratio map will be described later in detail.

At step S16, ECU 50 controls, through fuel injection valve control function 60, a fuel injector 15 for each cylinder in accordance with what is determined by any one of steps S12 through S15 for the injection of fuel.

Referring, next, to FIGS. 10 to 14, the details of fuel injection based on what is determined by any one of steps S12 through S15 are described.

Figure 10:
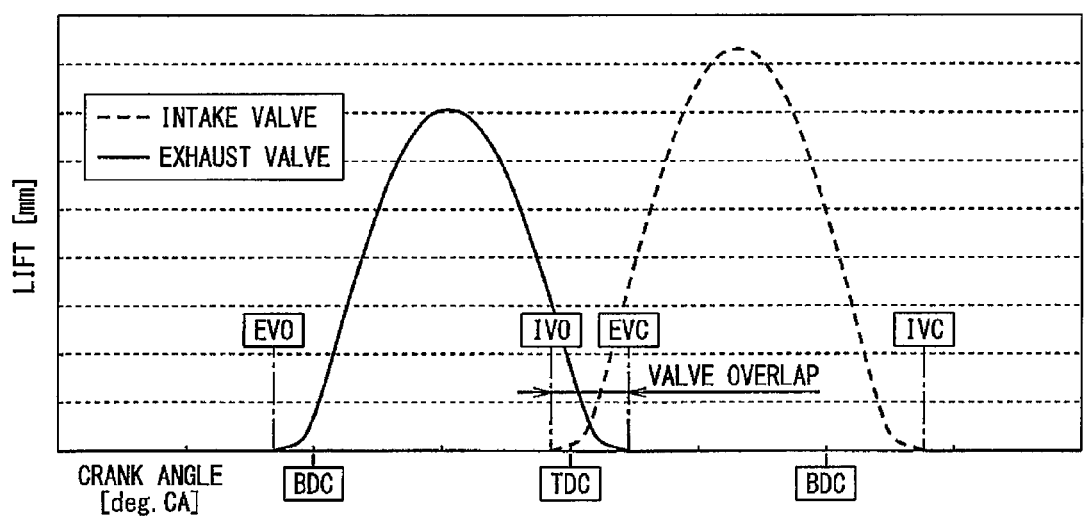
FIG. 10 is a timing diagram for an example engine, depicting the relationship among crank angle degrees, valve open/close timing of intake and exhaust valves and lift.

First of all, referring to FIG. 10, the relationship between crank angles (i.e. piston position) and intake/exhaust valve opening and closing timings is described. As shown in FIG. 10, exhaust valve opens (illustrated at EVO in FIG. 10) before piston position reaches bottom dead center (illustrated at BDC in FIG. 10) and subsequently as crank angle increases its valve lift increases, reaches the maximum and decreases. The exhaust valve closes (illustrated at EVC in FIG. 10) after the piston position has reached top dead center (illustrated at TDC in FIG. 10).

On the other hand, intake valve opens (illustrated at IVO in FIG. 10) before piston position reaches top dead center (illustrated at TDC in FIG. 10) and subsequently as crank angle increases its valve lift increases, reaches the maximum and decreases. The intake valve closes (illustrated at IVC in FIG. 10) after the piston position has reached bottom dead center (illustrated at BDC in FIG. 10).

Here, exhaust valve closes (illustrated at EVC in FIG. 10) after piston position has reached top dead center (illustrated at TDC in FIG. 10). On the other hand, intake valve opens (illustrated at IVO in FIG. 10) before piston position reaches top dead center (illustrated at TDC in FIG. 10). This causes valve overlap where both exhaust and intake valves open. Internal EGR takes place owing to this overlap. Crank angle (i.e. piston position), intake/exhaust valve opening/closing timings and valve lifts have the above-mentioned relationship.

Figure 11:
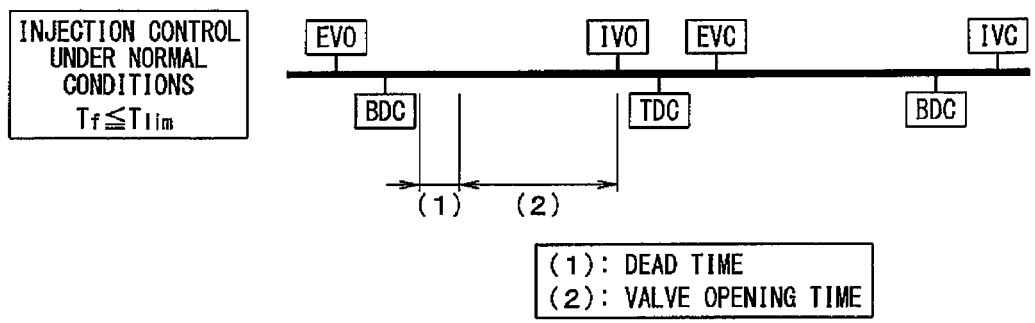
FIG. 11 is a timing diagram illustrating the injection of fuel during exhaust stroke, i.e., the injection of fuel in a normal condition, which may be determined at step S12 of the flow chart shown in FIG. 3.

Next, referring to FIG. 11, the exhaust stroke injection, the fuel injection under normal operating conditions, which is determined at step S12, is described. That is, referring to FIG. 11, the fuel injection, which is scheduled to be performed when gas temperature $T_f$ is less than or equal to criterion threshold $T_{lim}$ ($T_f \leq T_{lim}$) of gas temperature, is described. As shown in FIG. 11, the injection of fuel is performed, as exhaust stroke injection, during exhaust stroke after exhaust valve has opened (illustrated at EVO in FIG. 11). For details, exhaust stroke injection is initiated after piston position reaching bottom dead center (illustrated at BDC in FIG. 11) after exhaust valve has opened (illustrated at EVO in FIG. 11). Exhaust stroke injection is terminated at the moment when intake valve opens (illustrated at IVO in FIG. 11). Duration of its fuel injection (i.e. entire injection duration) may be divided into "a dead time (1)" and "a valve opening time (2)", in which the valve opening time (2) follows the dead time (1).

Dead time is herein used to mean a duration for which injection of fuel is not allowed. On the other hand, valve opening time is herein used to mean a duration for which injection of fuel is allowed. Dead time is an initial period from application of a fuel injection command to fuel injector 15 to initiation of current flowing through fuel injector 15 enough to open its valve. This dead time varies in response to the magnitude of current flowing through fuel injector 15. It is for this reason that ECU 50 holds a map showing the relationship between dead time and the magnitude of current flowing through fuel injector 15 and refers to this map to control fuel injection. This causes ECU 50 to terminate exhaust stroke injection before intake valve is about to open without any influence of current flowing through fuel injector 15.

Figure 12:
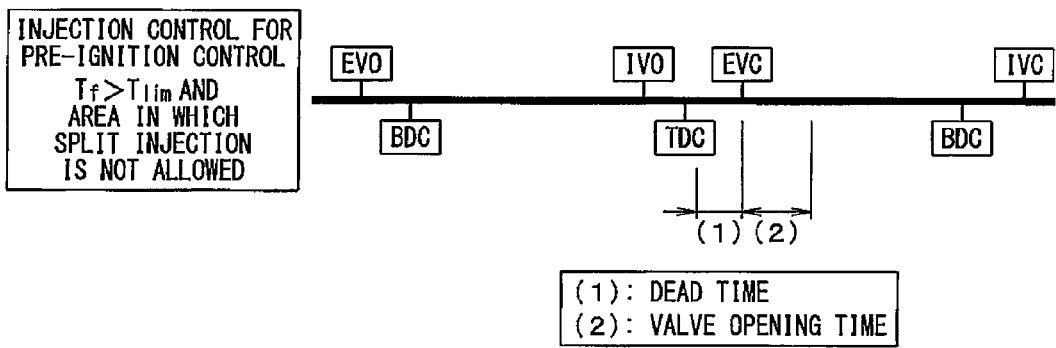
FIG. 12 is a timing diagram illustrating the injection of fuel during intake stroke, which may be determined at step S13 of the flow chart shown in FIG. 3.

Next, referring to FIG. 12, the intake stroke injection, which is determined at step S13, is described. That is, referring to FIG. 12, the fuel injection, which is scheduled to be performed when gas temperature $T_f$ is greater than criterion threshold $T_{lim}$ ($T_f>T_{lim}$) of gas temperature under operating conditions in which split injection is not allowed, is described. As shown in FIG. 12, the injection of fuel is performed, as intake stroke injection, during intake stroke after intake valve has opened (illustrated at IVO in FIG. 12). For details, dead time (1) for intake stroke injection is initiated after piston position reaching top dead center (illustrated at TDC in FIG. 12) after intake valve has opened (illustrated at EVO in FIG. 12), and subsequently fuel injection for valve opening time (2) is initiated after exhaust valve closes (illustrated at EVC in FIG. 12). Intake stroke injection is terminated before piston position reaching bottom dead center (illustrated at BDC in FIG. 12) before intake valve closes (illustrated at IVC in FIG. 12). In this manner, intake stroke injection is performed so that fuel injection for valve opening time (2) is initiated immediately after valve overlap.

For intake stroke injection, with reference to a map showing the relationship between dead time and the magnitude of current flowing through fuel injector 15, ECU 50 terminates dead time (1) before exhaust valve closes and initiates fuel injection for valve opening time (2) without any influence of the magnitude of current flowing through fuel injector 15.

Figure 13:
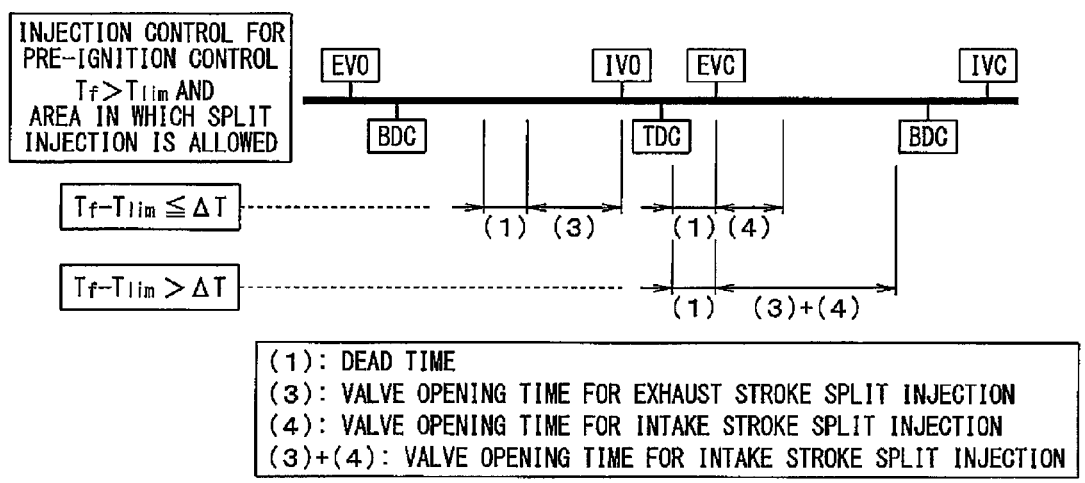
FIG. 13 is a timing diagram illustrating the injection of fuel during intake stroke, which may be determined at step S14 of the flow chart shown in FIG. 3, and the split injection of fuel, which may be determined at step S15 of the flow chart shown in FIG. 3.

Next, referring to FIG. 13, the intake stroke injection, which is determined at step S14, and the split injection, which is determined at step S15, are described. That is, referring to FIG. 13, the fuel injection, which is scheduled to be performed when gas temperature $T_f$ is greater than criterion threshold $T_{lim}$ ($T_f > T_{lim}$) of gas temperature under operating conditions in which split injection is allowed and the difference in gas temperature is greater than difference criterion threshold $\Delta T$ ($T_f - T_{lim} > \Delta T$), is described. Further, referring to FIG. 13, the fuel injection, which is scheduled to be performed when gas temperature $T_f$ is greater than criterion threshold $T_{lim}$ ($T_f > T_{lim}$) of gas temperature under operating conditions in which split injection is allowed and the difference in gas temperature is less than or equal to difference criterion threshold $\Delta T$ ($T_f - T_{lim} \le \Delta T$), is described.

As shown in FIG. 13, fuel injection during exhaust stroke after exhaust valve opening, illustrated at EVO in FIG. 13, (i.e. exhaust stroke injection) and fuel injection during intake stroke after intake valve opening, as illustrated at IVO in FIG. 13, (i.e. intake stroke injection) are performed as split injection that is determined at step S15.

For details, exhaust stroke injection performed as a part of split injection includes dead time (1), which is initiated after piston position reaching bottom dead center (illustrated at BDC in FIG. 13) after exhaust valve has opened (illustrated at EVO in FIG. 13). Further, exhaust stroke as the part of split injection includes fuel injection for valve opening time (for example, called "valve opening time for exhaust stroke split injection") (3), which is terminated before intake valve opens (illustrated at IVO in FIG. 13).

In addition, intake stroke injection performed as the remainder of split injection includes dead time (1), which is initiated after piston position has reached top dead center (illustrated at TDC in FIG. 13) and fuel injection for valve opening time (for example, called "valve opening time for intake stroke split injection") (4), which is initiated at the moment when exhaust valve closes (illustrated at EVC in FIG. 13). Further, intake stroke injection performed as split injection is terminated before piston position reaching bottom dead center (illustrated at BDC in FIG. 13) before intake valve closes (illustrated at IVC in FIG. 13). Further, for split injection, the sharing ratio of intake stroke injection is determined based on sharing ratio map. In concrete terms, the larger difference in gas temperature, the higher the ratio of intake stroke injection becomes.

Figure 14:
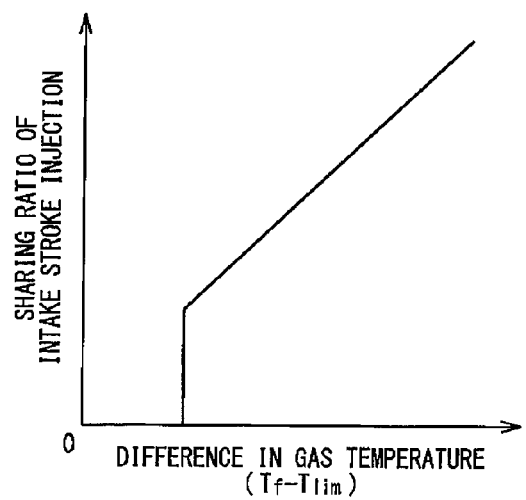
FIG. 14 shows an example sharing ratio map of the injection of fuel during intake stroke of the split injection of fuel versus the deviation in gas temperature.

FIG. 14 shows an example sharing ratio map indicating the relationship between difference in gas temperature and intake stroke injection belonging to split injection. For example, the sharing ratio map shown in FIG. 14 is experimentally, empirically or theoretically set beforehand. Injection control details determination function 59 holds the sharing ratio map shown in FIG. 14 and refers to this sharing ratio map to determine the ratio of intake stroke injection against a given value of difference in gas temperature.

On the other hand, referring to FIG. 13, as intake stroke injection, which is determined at step S14, fuel injection is performed during intake stroke after intake valve opens (illustrated at IVO in FIG. 13). For details, intake stroke injection includes dead time (1), which is initiated after piston position reaching top dead center (illustrated at TDC in FIG. 13) after intake valve opens (illustrated at IVO in FIG. 13), and fuel injection for valve opening time, which is initiated subsequently at the moment when exhaust valve closes (illustrated at EVC in FIG. 13). Then, the intake stroke injection is terminated before piston position reaching bottom dead center (illustrated at BDC in FIG. 13) before intake valve closes (illustrated at IVC in FIG. 13).

Valve opening time for intake stroke injection, which is determined at step S14, is equivalent to a duration ((3)+(4)), which is given by adding valve opening time (3) belonging to split injection determined at step S15 to valve opening time (4) belonging to split injection determined at step S15.

Further, intake stroke injection determined at step S14 may be divided into injection events which inject fuel multiple times. If, for example, intake stroke injection is divided into injection events which inject fuel two times, as the first fuel injection, dead time (1) is initiated after piston position reaching top dead center (illustrated at TDC in FIG. 13) after opening of intake valve (illustrated at IVO in FIG. 13) and subsequently fuel injection for valve opening time (3) is initiated at the moment when exhaust valve closes (illustrated at EVC in FIG. 13). Further, as the second fuel injection, dead time (1) is initiated after termination of fuel injection for real injection duration (3) of the first fuel injection and subsequently fuel injection for valve opening time (4) is performed.

Next, the procedure which ECU 50 follows, its effect and so forth are described. ECU 50 gets various pieces of information on engine speed, engine load ratio, base temperature of internal EGR gas, intake temperature, intake pressure, engine coolant temperature and closing timing of intake valve based on measurements from various sensors (at steps S1 to S7).

Further, ECU 50 uses in-cylinder absolute temperature $T_0$ when intake valve closes, in-cylinder volume $V_0$ when intake valve closes and in-cylinder volume $V_f$ when piston is at top dead center (i.e. when compressing) to calculate in-cylinder gas temperature $T_f$ (hereinafter referred to as "predicted in-cylinder gas temperature") when piston is at top dead center (i.e. when compressing), see step S8 and equation (1). On this occasion, ECU 50 amends $T_0$ and $V_0$ based on the previously retrieved engine speed, engine load ratio, base temperature in internal EGR gas, intake temperature, intake pressure, engine coolant temperature and closing timing of intake valve.

Further, ECU 50 determines to perform, as the details of injection control, exhaust stroke injection if predicted in-cylinder gas temperature $T_f$ is less than or equal to criterion threshold $T_{lim}$ of gas temperature and controls fuel injector 15 in accordance with the determined details (FIG. 11). Then, ECU 50 determines to perform, as the details of injection control, intake stroke injection if predicted in-cylinder gas temperature $T_f$ is greater than criterion threshold $T_{lim}$ of gas temperature under conditions in which split injection is not allowed and controls fuel injector 15 in accordance with the determined details (FIG. 12).

Then, ECU 50 determines to perform, as the details of injection control, intake stroke injection too if difference in gas temperature is greater than or equal to criterion threshold $\Delta T$ of difference though split injection is allowed because predicted in-cylinder gas temperature $T_f$ is greater than criterion threshold $T_{lim}$ of gas temperature and controls fuel injector 15 in accordance with the determined details (FIG. 13).

Further, ECU 50 determines to perform, as the details of injection control, split injection if difference in gas temperature is less than criterion threshold $\Delta T$ of difference and split injection is allowed because predicted in-cylinder gas temperature $T_f$ is greater than criterion threshold $T_{lim}$ of gas temperature and performs split injection in accordance with the determined details. Then, ECU 50 refers to sharing ratio map to determine ratio of intake stroke injection to split injection based on difference in gas temperature. Thus, ECU 50 controls fuel injector 15 in accordance with the determined details (FIGS. 13 and 14).

Further, in the description of the previously mentioned embodiment, in-cylinder gas temperature calculation function 58 constitutes, for example, in-cylinder temperature estimation function. Injection control details determination function 59 constitutes, for example, control modification function and difference calculation function. In-cylinder gas temperature calculation function 58, injection control details determination function 59 and fuel injection control function 60 constitute, for example, fuel injection control unit for an internal combustion engine. Intake passage 11 and intake manifold 12 constitute, for example, intake passageway or admission passageway. Exhaust manifold 21 and exhaust passage 22 constitute, for example, exhaust passageway. Correction coefficient $A_{in}$ constitutes, for example, first correction coefficient. Correction coefficient $B_{in}$ constitutes, for example, second correction coefficient. Correction coefficient $A_{ex}$ constitutes, for example, third correction coefficient. Correction coefficient $B_{ex}$ constitutes, for example, fourth correction coefficient. Correction coefficient $L_p$ constitutes, for example, fifth correction coefficient. Correction coefficient $L_w$ constitutes, for example, sixth correction coefficient.

According to the present embodiment, performing intake stroke injection to cause adhesion of liquid fuel to piston and cylinder when in-cylinder predicted gas temperature $T_f$ is greater than criterion threshold $T_{lim}$ of gas temperature can lower the in-cylinder temperature during compression stroke by cooling down side surfaces of piston and cylinder to lower the in-cylinder gas temperature due to latent heat of vaporization of the adhered fuel. This reduces pre-ignition combustion events, thus preventing damage on internal combustion engine 2 due to the pre-ignition combustion events.

Further, according to the present embodiment, gas temperature $T_f$ can be predicted with an extremely high degree of accuracy to meet operating conditions of internal combustion engine 2 by amending $T_0$ and $V_0$ based on the operating conditions of internal combustion engine 2, such as, engine speed, engine load ratio, base temperature of internal EGR gas, intake temperature, intake pressure, engine coolant temperature and closing timing of intake valve.

In the present embodiment, on the premise that internal combustion engine 2 is installed with intake VVT (Variable Valve Timing), intake valve closing timing detection function 57 detects closing timing of intake valve. Accordingly, if internal combustion engine 2 is not installed with intake VVT, the closing timing of intake valve may be set to a fixed value that is determined by the settings of engine specification.

In addition, in the present embodiment, FIGS. 4 to 9 are used to concretely describe correction coefficients $A_{ex}$, $B_{ex}$, $A_{in}$, $B_{in}$, $L_p$ and $L_w$. However, the present embodiment is not limited to such description. For example, it would be nice if the longer the overlap duration, the larger correction coefficient $A_{ex}$ becomes. In addition, it would be nice if the higher the engine coolant temperature and the engine speed, the larger correction coefficient $B_{ex}$ becomes. Further, it would be nice if the higher the engine speed and the intake pressure on the intake valve side, the larger correction coefficient $A_{in}$ becomes. Still further, it would be nice if the higher the engine coolant temperature and the intake pressure on the intake valve side, the larger correction coefficient $B_{in}$ becomes. Still further, it would be nice if the higher the intake pressure on the intake valve side, the larger correction coefficient $L_p$ becomes and the correction coefficient $L_p$ varies with engine speed. Further, it would be nice if the higher engine coolant temperature and engine speed, the larger correction coefficient $L_w$.

Having described embodiments of the present invention, it goes without saying that the present invention is not limited to the above-mentioned embodiment, but it may be implemented in numerous different variations within the subject matter of the present invention.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through prosecution of new claims in this or a related application. Such claims, whether broader, narrower, equal, or different in scope to the original claims, also be regarded as included within the subject matter of the present disclosure.

1 Vehicle, 2 Internal combustion engine, 41 Intake temperature sensor, 42 Intake pressure sensor, 43 Air flow sensor, 44 Exhaust temperature sensor, 45 Crank angle sensor, 46 Engine coolant temperature sensor, 47 Cam angle sensor, 50 ECU, 51 Engine speed detection function, 52 Engine load ratio calculation function, 53 Internal EGR gas base temperature detection function, 54 Intake temperature detection function, 55 Intake pressure detection function, 56 Engine coolant temperature detection portion, 57 Intake valve closing timing detection function, 58 In-cylinder gas temperature calculation function, 59 Injection control details determination function, 60 Fuel injection valve control function.

The invention claimed is:

1. A system for fuel injection control in an internal combustion engine for controlling a fuel injector, positioned upstream of an intake valve provided per each cylinder of the internal combustion engine, coupled to an admission path for admitting gas to the cylinder, comprising:
   a fuel injector control function configured to inject fuel from the fuel injector during exhaust stroke of the cylinder when an exhaust valve opens;
   an in-cylinder temperature prediction function configured to predict in-cylinder temperature as the cylinder undergoes compression;
   a control modification function configured to modify control by the fuel injector control function so as to inject fuel from the fuel injector during intake stroke of the cylinder when the intake valve opens to supply fuel to the inside of the cylinder upon determining that the in-cylinder temperature as the cylinder undergoes compression which is predicted by the in-cylinder temperature prediction function is greater than a predetermined temperature beyond which pre-ignition is expected to happen;
   a difference calculation function configured to calculate, when the control modification function determines that the in-cylinder temperature as the cylinder undergoes compression which is predicted by the in-cylinder temperature prediction function is higher than the predetermined temperature beyond which pre-ignition is expected to happen, a difference between the in-cylinder temperature as the cylinder undergoes compression and the predetermined temperature beyond which pre-ignition is expected to happen; and
   wherein the control modification function modifies control by the fuel injector control function so as to inject fuel from the fuel injector during the intake stroke to supply fuel to the inside of the cylinder upon determining that the difference which is calculated by the difference calculation function is greater than a predetermined threshold, and modifies control by the fuel injector control function so as to inject fuel from the fuel injector during the exhaust stroke and to inject fuel from the fuel injector during the intake stroke immediately after the exhaust stroke to supply fuel to the inside of the cylinder upon determining that the difference which is calculated by the difference calculation function is less than or equal to the predetermined threshold.

2. The system for fuel injection control according to claim 1,
wherein the control modification function modifies control by the fuel injector control function so as not to inject fuel from the fuel injector during the exhaust stroke but to inject fuel in volume, which is given by adding the volume of fuel scheduled to be injected during the exhaust stroke to the volume of fuel scheduled to be injected during the intake stroke immediately after the exhaust stroke, from the fuel injector during the intake stroke to supply fuel to the inside of the cylinder upon determining that the fuel injection period to be implemented during exhaust stroke is shorter than a predetermined fuel injection period even when the difference which is calculated by the difference calculation function is less than or equal to the predetermined threshold.

3. The system for fuel injection control according to claim 1,
wherein the control modification function raises a sharing ratio of the injection period for intake stroke injection to the total injection period given by adding the injection period for the exhaust stroke injection to the injection period for the intake stroke injection such that the smaller the difference, the higher the sharing ratio becomes.

4. The system for fuel injection control according to claim 1,
wherein the fuel injection for the exhaust stroke is terminated before the intake valve opens and the fuel injection for the intake stroke is initiated after the exhaust valve closes.

5. The system for fuel injection control according to claim 1,
wherein the internal combustion engine admits exhaust gases into the inside of the cylinder by external Exhaust Gas Recirculation and internal Exhaust Gas Recirculation;
wherein the system further comprises:
an intake temperature detection function, coupled to the admission path of the internal combustion engine, configured to measure temperature of gas admitted into the inside of the cylinder from the intake valve side;
an exhaust temperature detection function, coupled to an exhaust path for exhausting exhaust gas from the internal combustion engine at a portion upstream of a catalyst for purifying the exhaust gas, configured to measure temperature of the exhaust gas;
a gas temperature calculation function configured to correct the gas temperature measured by the intake temperature detection function with a first correction coefficient, which becomes bigger as the engine speed and the intake pressure on the intake valve side become higher, and also with a second correction coefficient, which becomes bigger as the engine coolant temperature and the intake pressure on the intake valve side become higher to calculate the corrected temperature of the gas; and
an exhaust gas temperature calculation function configured to correct the exhaust gas temperature measured by the exhaust gas temperature detection function with a third correction coefficient, which becomes bigger as the valve overlap when the exhaust valve and the intake valve open become longer, and also with a fourth correction coefficient, which becomes bigger as the engine coolant temperature and the engine speed become higher to calculate the corrected temperature of the exchange gas, and
wherein the in-cylinder temperature prediction function calculates the in-cylinder temperature as the cylinder undergoes compression based on the temperature of gas calculated by the gas temperature calculation function and the temperature of exhaust gas calculated by the exhaust gas temperature calculation function.

6. The system for fuel injection control according to claim 5,
wherein the in-cylinder temperature prediction function calculates the in-cylinder temperature $T_f$ as the cylinder undergoes compression, which temperature is expressed by $$T_f = T_0 \cdot (V_0/V_f)^{(k-1)}$$

where $V_0$ is the in-cylinder volume as corrected by correcting that volume which is defined in the cylinder by the piston positioned when the intake valve closes with a fifth correction coefficient, which becomes bigger as the intake pressure on the intake valve side becomes higher and varies in response to engine speed, and a sixth correction coefficient, which becomes bigger as the engine coolant temperature and the engine speed become higher; $T_0$ is the temperature of gas in the cylinder when the intake vale closes; $V_f$ is the volume that is defined in the cylinder by the piston positioned at top dead center; and k is the heat capacity ratio.

7. A system for fuel injection control in an internal combustion engine for controlling a fuel injector, positioned upstream of an intake valve provided per each cylinder of the internal combustion engine, coupled to an admission path for admitting gas to the cylinder, comprising:
a fuel injector control function configured to inject fuel from the fuel injector during exhaust stroke of the cylinder when an exhaust valve opens;
an in-cylinder temperature prediction function configured to predict in-cylinder temperature as the cylinder undergoes compression; and
a control modification function configured to modify control by the fuel injector control function so as to inject fuel from the fuel injector during intake stroke of the cylinder when the intake valve opens to supply fuel to the inside of the cylinder upon determining that the in-cylinder temperature as the cylinder undergoes compression which is predicted by the in-cylinder temperature prediction function is greater than a predetermined temperature beyond which pre-ignition is expected to happen;
wherein the fuel injection for the exhaust stroke is terminated before the intake valve opens and the fuel injection for the intake stroke is initiated after the exhaust valve closes.

8. A system for fuel injection control in an internal combustion engine for controlling a fuel injector, positioned upstream of an intake valve provided per each cylinder of the internal combustion engine, coupled to an admission path for admitting gas to the cylinder, comprising:
- a fuel injector control function configured to inject fuel from the fuel injector during exhaust stroke of the cylinder when an exhaust valve opens;
- an in-cylinder temperature prediction function configured to predict in-cylinder temperature as the cylinder undergoes compression; and
- a control modification function configured to modify control by the fuel injector control function so as to inject fuel from the fuel injector during intake stroke of the cylinder when the intake valve opens to supply fuel to the inside of the cylinder upon determining that the in-cylinder temperature as the cylinder undergoes compression which is predicted by the in-cylinder temperature prediction function is greater than a predetermined temperature beyond which pre-ignition is expected to happen;
- wherein the internal combustion engine admits exhaust gases into the inside of the cylinder by external Exhaust Gas Recirculation and internal Exhaust Gas Recirculation; and
- wherein the system further comprises:
- an intake temperature detection function, coupled to the admission path of the internal combustion engine, configured to measure temperature of gas admitted into the inside of the cylinder from the intake valve side;
- an exhaust temperature detection function, coupled to an exhaust path for exhausting exhaust gas from the internal combustion engine at a portion upstream of a catalyst for purifying the exhaust gas, configured to measure temperature of the exhaust gas;
- a gas temperature calculation function configured to correct the gas temperature measured by the intake temperature detection function with a first correction coefficient, which becomes bigger as the engine speed and the intake pressure on the intake valve side become higher, and also with a second correction coefficient, which becomes bigger as the engine coolant temperature and the intake pressure on the intake valve side become higher to calculate the corrected temperature of the gas; and
- an exhaust gas temperature calculation function configured to correct the exhaust gas temperature measured by the exhaust gas temperature detection function with a third correction coefficient, which becomes bigger as the valve overlap when the exhaust valve and the intake valve open become longer, and also with a fourth correction coefficient, which becomes bigger as the engine coolant temperature and the engine speed become higher to calculate the corrected temperature of the exchange gas, and
- wherein the in-cylinder temperature prediction function calculates the in-cylinder temperature as the cylinder undergoes compression based on the temperature of gas calculated by the gas temperature calculation function and the temperature of exhaust gas calculated by the exhaust gas temperature calculation function.

9. The system for fuel injection control according to claim 8,
- wherein the in-cylinder temperature prediction function calculates the in-cylinder temperature $T_f$ as the cylinder undergoes compression, which temperature is expressed by $$T_f = T_0 \cdot (V_0/V_f)^{(k-1)}$$

where $V_0$ is the in-cylinder volume as corrected by correcting that volume which is defined in the cylinder by the piston positioned when the intake valve closes with a fifth correction coefficient, which becomes bigger as the intake pressure on the intake valve side becomes higher and varies in response to engine speed, and a sixth correction coefficient, which becomes bigger as the engine coolant temperature and the engine speed become higher; $T_0$ is the temperature of gas in the cylinder when the intake vale closes; $V_f$ is the volume that is defined in the cylinder by the piston positioned at top dead center; and k is the heat capacity ratio.

* * * * *